Feb. 27, 1934. H. JYRCH 1,948,922

RESILIENT SUPPORT FOR MOTOR CARS

Filed Dec. 16, 1931

Patented Feb. 27, 1934

1,948,922

UNITED STATES PATENT OFFICE 1,948,922

RESILIENT SUPPORT FOR MOTOR CARS

Herbert Jyrch, Dresden, Germany

Application December 16, 1931, Serial No. 581,431
In Germany December 16, 1930

5 Claims. (Cl. 280—106.5)

Application has been filed in Germany December 16, 1930.

The invention relates to shock absorbing devices for motor-cars, in particular to a shock absorbing device in which an oscillating member situated in the longitudinal centre line of the frame and connected to the rear axle of the car engages with and is free to move in another similar member pivotally connected with the frame and oscillating round an axis at right angles to the longitudinal centre line of the frame. Hitherto, shock absorbing devices provided in conjunction with such oscillating members and the frame of the car have mostly been fixed near the one end of the oscillating member mentioned.

According to the present invention, the shock absorbing device arranged between the chassis and the oscillating member is situated as near as possible to the transversal axis of the oscillating member, the latter being of T-shape, being pivotally connected with the car frame and engaging with a similar member of T-shape carrying the rear wheels. The engaging parts of both T-shaped members interlock sufficiently in order to ensure reliable guiding and free movement round the longitudinal axis of the chassis.

It has been found to be of advantage to give the part of the oscillating member engaging with the rear oscillating member a conical bore and to suitably lock both members.

It is indifferent what spring means may be employed for absorbing shock but very much of advantage if these are adjustable. For example, both ends of the transversal part of the front oscillating member may be provided with openings for the reception of plate springs attached to adjustable projections on the chassis. Such openings may, however, be omitted, if suitable surfaces are provided on the oscillating member near the chassis for fixing the plate springs. Instead of plate springs, spiral springs may be employed to the same advantage.

The arrangement mentioned offers the following advantages in comparison to constructions hitherto known: When the car is passing over bumps in the road, the front part of the chassis being thus lifted, this lifting motion is not transmitted to the rear axle and thus to the chassis as in the case of the constructions known; owing to the shock absorbing device provided in the central part of the chassis (near to the transversal axis of the oscillating member pivotally fixed to the frame), downward motion is thus imparted to the rear part of the chassis, while the part of the chassis near the transversal axis of the oscillating member keeps the same distance from the track. This means that when such dangerous bumps in the road are being passed, the driver's seat remains approximately in neutral position. This again ensures safer driving. For persons occupying the rear seats of the car, the downward motion of the chassis is not so unpleasant as the jolting in upward direction. The resulting counter-movement may be compensated by any of the well known oscillation absorbing means.

According to the invention, greatest possible advantage is taken of the lever action of the oscillating Cardan shaft, because the shock absorbing spring means may be placed as far near to the end of the whole oscillating arrangement as is possible without dangerous strain to the spring material.

The arrangement mentioned has the further advantage that the springs are not subject to any dangerous strain in side direction or to shearing force, but are situated in a protected position in the central part of the chassis, remaining approximately on a level with same. Three point suspension is well maintained, this ensuring the proper position of all four wheels on an uneven track and eliminating twisting strain on the chassis when the rear wheels are alternately lifted.

In constructions hitherto known, the advantages mentioned have not been attained, as the springs are mostly situated in a vertical longitudinal centre plane of the oscillating rear axle or directly attached to and free to move in longitudinal direction on the Cardan supporting tube.

The following is a description of an embodiment of my invention, reference being had to the accompanying drawing, in which.

Figure 1:
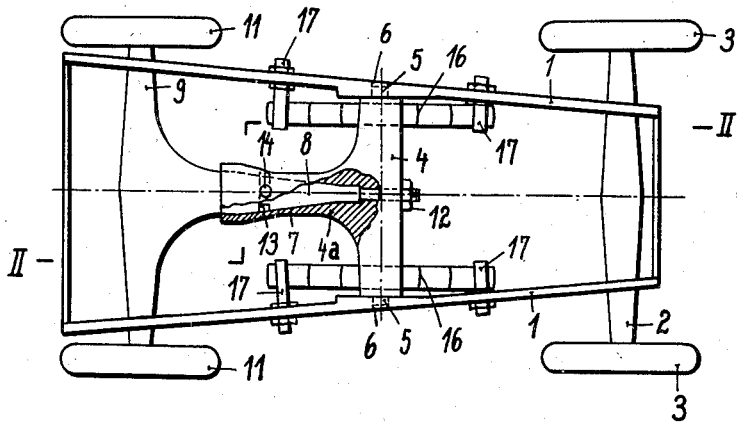
Fig. 1 is a top view of one constructional form.
Figure 2:
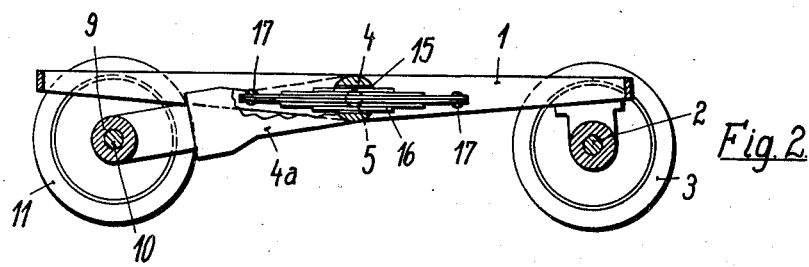
Fig. 2 is a side view partly in section on line II—II.

The chassis 1 is shown carrying the front axle 2 and the wheels 3. Situated approximately in the centre part of the frame is a T-shaped oscillating member 4 pivotally connected by means of journals 5 in holes 6. Part 4a of member 4 is provided with a conical bore 7 in order to receive part 8 of the T-shaped oscillating member 9 carrying the rear axle 10 and the wheels 11. Both T-shaped parts may be locked by suitable means e. g. by means of a nut 12 or a screw 14 projecting into a groove 13. The oscillating member 4 is further provided with openings 15 for the reception of plate springs 16 fixed to parts 17 movably mounted in slots (not shown) for the purpose of adjusting the spring tension.

Figure 3:
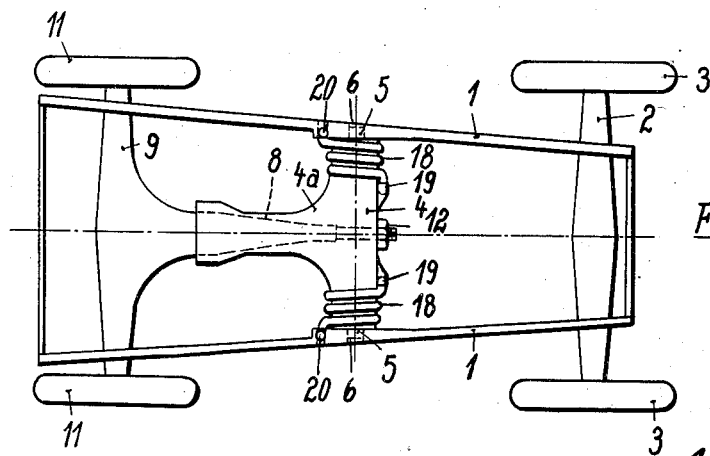
Fig. 3 is a somewhat modified constructional form.

In Fig. 3, the plate springs have been substituted by a spiral spring 18 supported by projections 19, 20. If screws are attached to the latter, it is in this case also possible to adjust the tension of the shock absorbing springs.

I claim:—

1. The combination with a vehicle frame, of a T-shaped member having the head of the T journalled at each arm to a respective side of the frame to permit the member to oscillate on a horizontal axis transversely of the frame, the stem of said member being in the longitudinal vertical medial plane of the frame, a second T-shaped member having its head forming a wheel axle and its stem axially alined with the stem of the first member, a pivotal connection between said stems arranged to permit rotative movement of the second member on the axis of said stems, and spring means connecting said first member and frame and arranged to hold the latter normally in a horizontal plane.

2. The combination with a vehicle frame, of a T-shaped member having the head of the T journalled at each arm to a respective side of the frame to permit the member to oscillate on a horizontal axis transversely of the frame, the stem of said member being in the longitudinal vertical medial plane of the frame, a second T-shaped member having its head forming a wheel axle and its stem axially alined with the stem of the first member, one of said stems being journalled within the other to provide a pivotal connection between said stems arranged to permit rotative movement of the second member on the axis of said stems, and spring means connecting said first member and frame and arranged to hold the latter normally in a horizontal plane.

3. The combination with a vehicle frame, of a T-shaped member having the head of the T journalled at each arm to a respective side of the frame to permit the member to oscillate on a horizontal axis transversely of the frame, the stem of said member being in the longitudinal vertical medial plane of the frame, a second T-shaped member having its head forming a wheel axle and its stem axially alined with the stem of the first member, one of said stems being provided with a frusto-conical socket and the other stem having a frusto-conical end fitting in said socket to provide a pivotal connection between said stems arranged to permit rotative movement of the second member on the axis of said stems, and spring means connecting said first member and frame and arranged to hold the latter normally in a horizontal plane.

4. The combination with a vehicle frame, of a T-shaped member having the head of the T journalled at each arm to a respective side of the frame to permit the member to oscillate on a horizontal axis transversely of the frame, the stem of said member being in the longitudinal vertical medial plane of the frame, a second T-shaped member having its head forming a wheel axle and its stem axially alined with the stem of the first member, a pivotal connection between said stems arranged to permit rotative movement of the second member on the axis of said stems, spring means connecting said first member and frame and arranged to hold the latter normally in a horizontal plane, said spring means comprising leaf springs extending through the arms of the head of the first member longitudinally of the frame, and means for adjustably connecting the ends of the leaf springs to said frame to regulate the tension of the springs.

5. The combination with a vehicle frame, of a T-shaped member having the head of the T journalled at each arm to a respective side of the frame to permit the member to oscillate on a horizontal axis transversely of the frame, the stem of said member being in the longitudinal vertical medial plane of the frame, a second T-shaped member having its head forming a wheel axle and its stem axially alined with the stem of the first member, a pivotal connection between said stems arranged to permit rotative movement of the second member on the axis of said stems, and spring means connecting said first member and frame and arranged to hold the latter normally in a horizontal plane, said spring means comprising spiral torsion springs wound around the arms of the head of the first member and each having one end connected to a frame member and its other end connected to the first member.

HERBERT JYRCH.